May 26, 1953          A. B. SOWTER          2,639,633
                   COLD WELDING OF METAL
Filed Aug. 7, 1948                        2 Sheets-Sheet 1
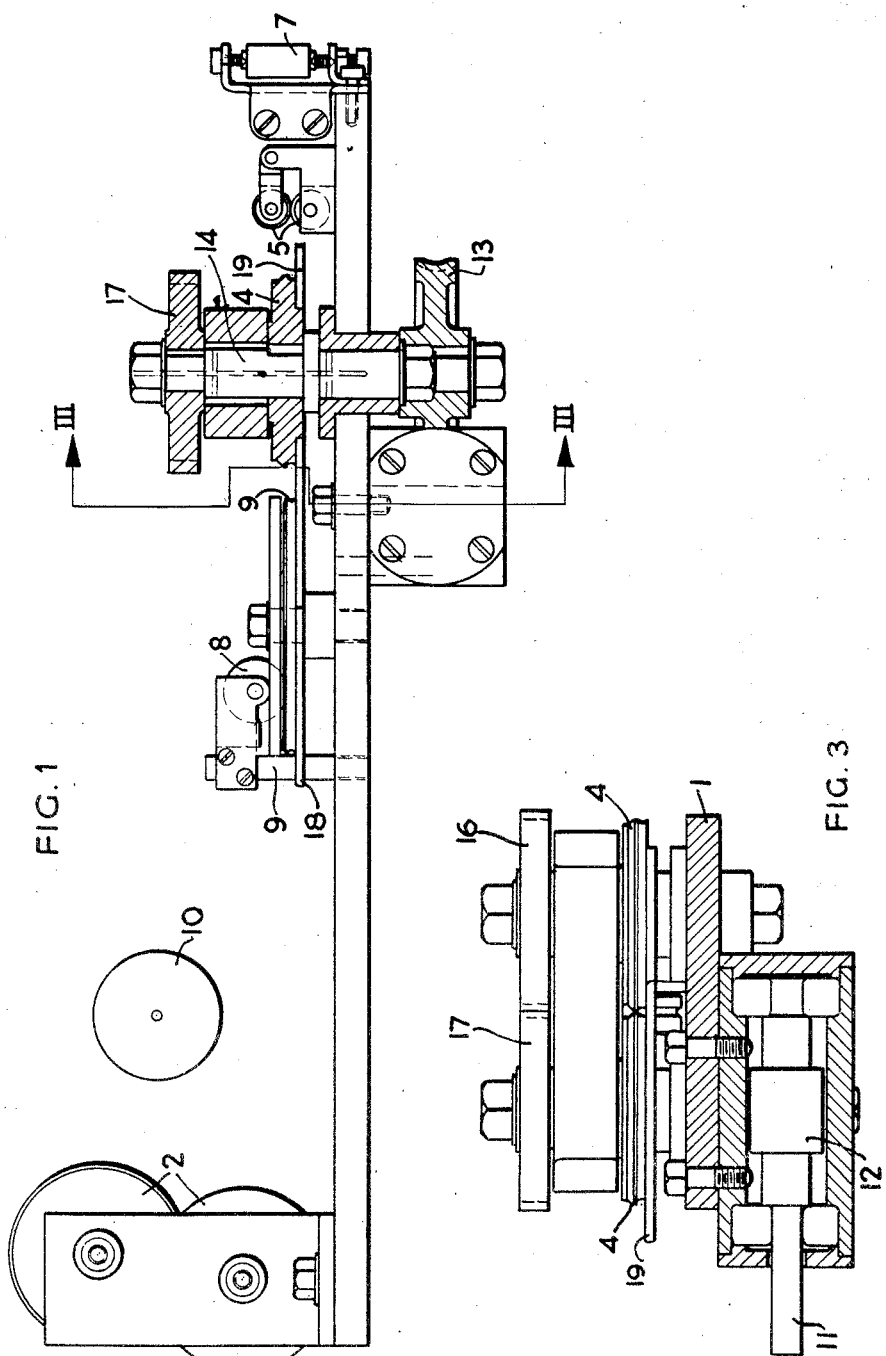
INVENTOR
ANTHONY BAGNOLD SOWTER
BY
ATTORNEY May 26, 1953  A. B. SOWTER  2,639,633
COLD WELDING OF METAL
Filed Aug. 7, 1948  2 Sheets-Sheet 2
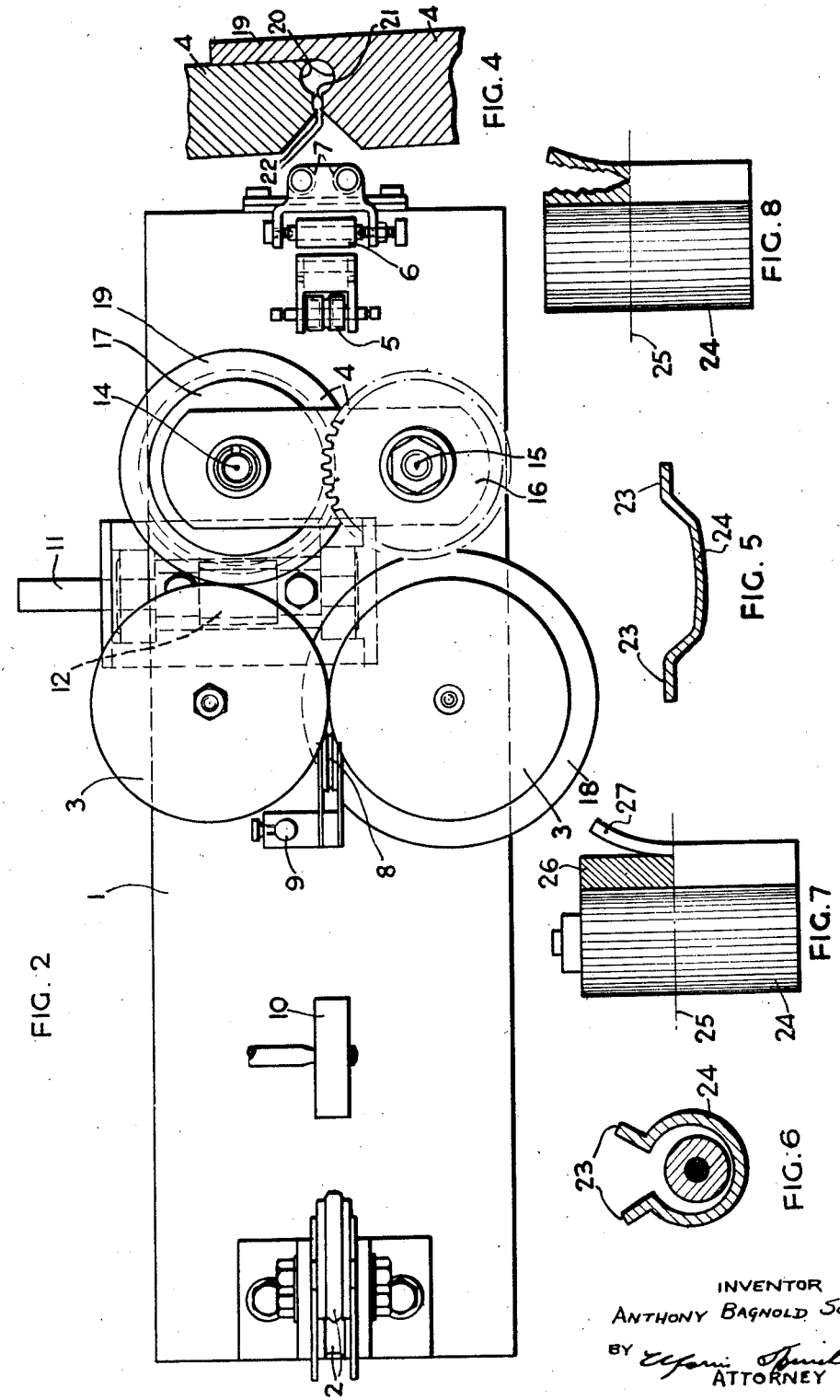
INVENTOR
ANTHONY BAGNOLD SOWTER
BY
ATTORNEY Patented May 26, 1953

2,639,633

UNITED STATES PATENT OFFICE 2,639,633

COLD WELDING OF METAL

Anthony Bagnold Sowter, Wembley, England, assignor to The General Electric Company, Limited, London, England Application August 7, 1948, Serial No. 43,096
In Great Britain April 24, 1947

2 Claims. (Cl. 78—82)

This invention relates to the cold welding of metal such as aluminium, aluminium alloys, copper etc.

It is well known that surfaces of certain metals can be cold welded together to produce an hermetic seal and one of the objects of the present invention is the provision of a method of and apparatus for cold welding the seam of an aluminium sheath for an electric cable.

According to one aspect of the present invention, a method of welding together the contacting surfaces of two metallic strips, flanges or the like capable of being cold welded comprises applying pressure with a tool to produce a cold weld with only a percentage reduction in thickness of the two strips, flanges or the like, the surface of the tool in the direction of flow of metal or welding being substantially flat. Laterally of the said line, shearing or parting off excess metal may be effected.

Extensions or parts of the cooperating tools which produce the cold weld may shear or part off the excess metal or, alternatively, separate shearing or parting tools may be used.

According to another aspect of the invention, apparatus for welding together the contacting surfaces of two strips, flanges or the like of metal capable of being cold welded, comprises first tool means arranged to produce along one line a cold weld with only a percentage reduction in thickness of the two strips, flanges or the like and second tool means arranged to shear or part off excess metal laterally of the said line. The first and second tool means may be combined in a single pair of cooperating tools.

Thus, the apparatus may comprise a pair of pressure rolls through which two strips or flanges are fed and the pressure surfaces of the rolls may be such that they produce both a cold weld and a shear. The said surfaces may be flanged somewhat in the form of railway wheels, the flanges producing shearing or parting off.

Apparatus for cold welding the seam of an aluminium sheath of a single core electric cable and in accordance with the present invention will now be described by way of example with reference to the accompanying drawings in which Figure 1 shows a side elevation, partly in section, of the apparatus, Figure 2 shows a plan view of the apparatus, some parts being omitted and others broken away for clarity, Figure 3 shows a section on the line III—III in Figure 1, Figure 4 shows, in detail, the forming edge of the pair of pressure rolls in the apparatus, Figure 5 shows the shape of the aluminium strip used for sheathing the cable after it has passed through the first set of rolls of the apparatus, Figure 6 shows the strip shape after it has passed through the second set of rolls and contains the single electric conductor, Figure 7 shows the cable as it is operated on by the cold welding or pressure rolls and Figure 8 shows a similar view of the cable as it would appear if no shearing or parting off edges were provided on the pressure rolls.

Referring now to the drawings and, more particularly, Figures 1-4 thereof, the apparatus comprises a steel base plate 1 on which all the various rolls are mounted and these rolls comprise a first pair of rolls 2, a second pair 3, a pair of cold welding or pressure rolls 4, a pair of finishing rolls 5 and two pairs of guiding rolls 6 and 7. A feed wheel 8 is mounted adjustably on a pillar 9 for guiding the electric conductor (not shown) into the aluminium sheath, this feed wheel 8 being placed between the first and second pairs of rolls 2 and 3 adjacent the set 3. A rotating scratch brush 10 is also provided between the pairs of rolls 2 and 3 for cleaning the edges of the aluminium strip to be cold welded together and this is driven by an independent electric motor (not shown).

Only the cold welding rolls 4 are arranged to be driven, these rolls 4 drawing or forcing the aluminium sheath through the other rolls, and, for this purpose, a horizontal cross shaft 11 is provided. This drives a worm gear 12 meshing with a gear wheel 13 on the bottom of a vertical shaft 14 carrying one roll 4, the roll 4 being keyed to the shaft 14, and the shaft 15 of the other roll 4 is driven through a gear wheel 16 on the shaft 15 meshing with a gear wheel 17 on the shaft 14. The shaft 11 is arranged to be driven in any suitable manner, for example, it may be driven from an electric motor by way of pulleys and belt drive, one pulley being mounted on the shaft 11.

The rolls of each of pairs of rolls 3 and 4 are not exactly identical since it will be seen that one roll 3 is provided with a flat flange 18 which runs under the other roll 3 whilst one roll 4 is provided with a flat flange 19 which runs under the other roll 4. These flanges 18 and 19 back up the lower edges of the forming portions of the rolls.

The forming portions of the rolls 4 can be seen better from Figure 4 and it will be seen that each roll has a semi-circular portion 20, a flat cold welding portion 21 and a projecting portion or flange 22, the flanges of the two rolls almost meeting. The portions 22 effect the shearing or parting off of excess metal flowing and displaced laterally as a result of the cold weld and, if desired, they may actually meet.

The operation of the apparatus is as follows. Aluminium strip of the correct width and thickness is fed first through the rolls 2 whose cooperating surfaces are so shaped as to produce a strip section as shown in Figure 5. Then the strip is passed under the rotating scratch brush 10 which cleans the edges of the flanges 23 of the strip 24 to ensure a good cold weld. The next step is to feed the electric conductor into the strip and this is done by the wheel 8. The strip 24 now moves between the rolls 3 and these rolls 3 force up the flanges 23 of the strip 24 and when it leaves the rolls 3, its section is as shown in Figure 6.

The strip 24 is now ready for the cold welding and shearing operation and passes to the rolls 4 which press the flanges 23 together with sufficient pressure to cause the metal of the flanges to flow laterally of the faces 24 and thereby to cold weld them together, the portions 22 shearing off the excess metal. A partial reduction of about 70% is obtained at the cold weld and then the sheathed cable passes through the rolls 5 which take off the sharp edge left by the portions 22 of the rolls 4, and the guiding rolls 6 and 7. Despite the substantial reduction in thickness of the flanges 23 over the flat welding area, being about 70% in the case of aluminium as pointed out, a mechanically sufficiently strong weld or joint is obtained on account of the work or pressure hardening of the metal at the weld due to the cold pressure working during the welding operation, strain or work hardening of this type resulting from any kind of cold working of metal being a commonly known fact in the art.

Referring now to Figure 7, as the strip 24 moves past the cold welding and shearing line 25, so a cold weld 26 is produced and the excess metal 27 is sheared off and curls away. By providing the projecting portions 22 on the rolls 4, better welding and sealing is produced than if flat rolls were used. Actually flat rolls sometimes produce shearing automatically even without 100% reduction in thickness of the metal between the pressure rolls and where this self-parting or self-shearing occurs as is indicated somewhat diagramatically in Figure 8, there is a tendency for tears to run through the weld.

If desired, when the seam of the cable sheath has been welded as described above, the seam may be turned over into the main cable sheath or otherwise treated to reduce the projecting size thereof. It is, for example, possible to increase the thickness of metal at or near the weld by a swaging process, in which the seam is driven back towards the centre of the cable.

For this purpose, a roller may be provided situated on the outlet side of the pressure rolls 4, the roller having its axis horizontal and being of tapering or frusto-conical shape so that the weld is bent or set over at an angle as it engages the roller's surface. Thereafter, a further set of rolls may force the seam towards the central axis of the cable.

Where say two conductors are enclosed in the sheath, the weld may be driven towards the central axis of the cable between the two conductors.

In order to arrive at a thickness of welded seam comparable with the thickness of the original aluminium strip 24, the flanges 23 of the strip 24 may be of increased thickness or the edges may be turned over to double the thickness of metal.

In the apparatus as described above, the axes of the rolls 4 are at right angles to the length of the strip 24 of aluminium as it passes through the rolls 3 and 4 and the excess metal 27 curls away to one side. The strip width and size is relatively small and the excess metal 27 has little strength and can move in this fashion but where larger cable sheathing is being made, it is sometimes advisable to turn the axes of the pressure rolls at a suitable angle other than 90° to the length of the aluminium strip so that, in effect, the welded sheath leaves the rolls at an angle other than 90° to the axes of the rolls whilst the excess metal leaves at an angle of 90° to the roll axes. This ensures that excess metal sheared off cannot affect the cold welded seam.

I claim:

1. Apparatus for welding together outwardly-extending flanges of a pre-formed circular-bent metal strip comprising a pair of pressure rolls, said rolls including cooperating opposed peripheral grooves to receive the circular-bent strip, intermediate cooperating peripheral portions adjacent the grooves to engage and apply welding pressure to the outside surfaces of said outwardly-extending flanges, and cooperating outwardly-extending peripheral shearing edges positioned at the side of said pressure-applying portions remote from said grooves, to shear off the outer edge portions of said flanges substantially simultaneously with the welding of the flanges together.

2. Apparatus as defined in claim 1 in which one of said pressure rolls has an outwardly-extending flange which underlies the other pressure roll.

ANTHONY BAGNOLD SOWTER.

References Cited in the file of this patent
UNITED STATES PATENTS

| Number | Name | Date |
|---|---|---|
| 56,152 | Weinger | July 3, 1866 |
| 276,725 | Smith | May 1, 1883 |
| 306,037 | Turner | Sept. 30, 1884 |
| 315,626 | Jackson | Apr. 14, 1885 |
| 415,262 | Wetmore | Nov. 19, 1889 |
| 469,663 | Greenfield | Feb. 23, 1892 |
| 898,259 | Preston | Sept. 8, 1908 |
| 1,121,709 | Bryner | Dec. 22, 1914 |
| 1,124,766 | Lloyd | Jan. 12, 1915 |
| 1,476,632 | Moon | Dec. 4, 1923 |
| 1,506,038 | Anderson | Aug. 26, 1924 |
| 1,629,724 | Moon | May 24, 1927 |
| 1,794,902 | Johnson | Mar. 3, 1931 |
| 1,881,020 | McFarland | Oct. 4, 1932 |
| 1,910,271 | Williams | May 23, 1933 |
| 1,991,973 | Anderson | Feb. 19, 1935 |
| 2,063,798 | Firth | Dec. 8, 1936 |
| 2,427,597 | Garner | Sept. 16, 1947 |
| 2,502,012 | Kinkead | Mar. 28, 1950 |
| 2,522,408 | Sowter | Sept. 12, 1950 |

FOREIGN PATENTS

| Number | Country | Date |
|---|---|---|
| 65,552 | Norway | Nov. 30, 1942 |

OTHER REFERENCES

Aircraft Production, "Pressure Welding," pages 450–451, September 1946.

The Engineer, "Developments in Cold Welding," pgs. 432–433, April 30, 1948.

Electrical Engineers, "Stainless Steel-Sheathed Aerial Cable," pages 107–109, vol. 36, Jan. 1944.